July 5, 1955     W. M. SCHOLL     2,712,311
MOLDED FOAM LATEX SURGICAL PAD AND METHOD OF MAKING SAME
Filed Sept. 9, 1950
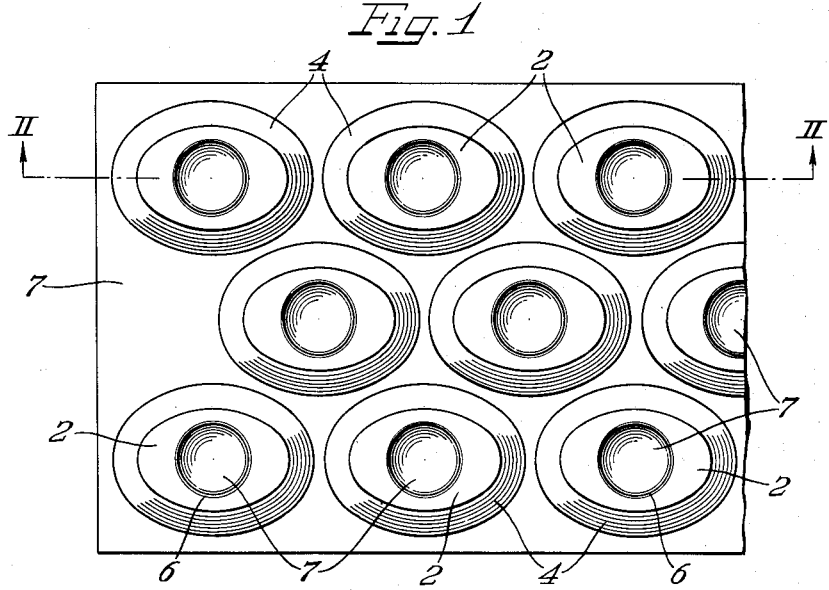
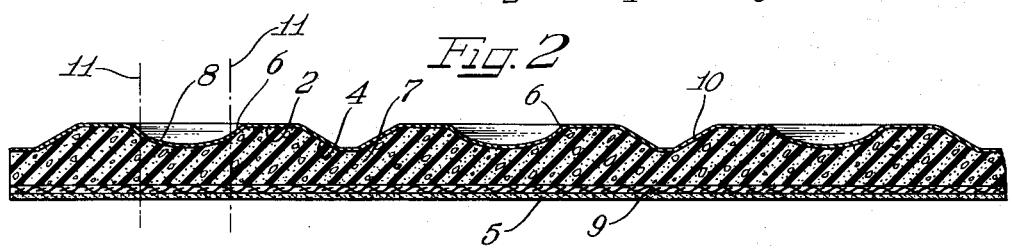
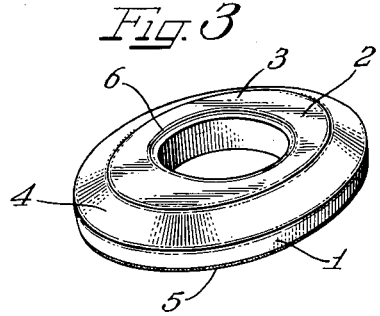
Inventor
William M. Scholl

United States Patent Office 2,712,311
Patented July 5, 1955

2,712,311

MOLDED FOAM LATEX SURGICAL PAD AND METHOD OF MAKING SAME

William M. Scholl, Chicago, Ill.

Application September 9, 1950, Serial No. 184,075

2 Claims. (Cl. 128—153)

This invention relates to improvements in a molded foam latex surgical pad and the method of making the same, and more particularly to a surgical pad of the type commonly attached directly to the human body over an affliction of the type of a corn, callus, bunion, minor injury, skin ailment, etc., although the invention will have other uses and purposes as will be apparent to one skilled in the art.

In the past, surgical pads of the type of corn and callus pads have been made from many and various materials including sponge rubber, foam latex, felt, and other substances. Difficulties have been experienced with such pads due to their absorption of water in the bath or shower, due to the fact that they were not as durable as desired, especially when made of foam latex, and also due to the fact that they would have sharp edges unless made of felt or some firm body cushioning element that is not desirable in all cases.

In every instance of which I am aware, in the past, wherein foam latex was used for such a pad the body of the pad was from cut or split latex. It was customary to take a relatively thick sheet of foam latex, and split the sheet longitudinally, and then sever the individual pads from split sections of the sheet. When such was done, the exposed surfaces of the pad had relatively large openings or pores therein which, in most cases, communicated with other interior openings or cells in the latex body of the pad. Obviously, such construction would absorb water in the bath or shower, and was not as durable as desired, unless substantially reinforced by fabric layers doubled thereto.

With the foregoing in mind, it is an important object of the instant invention to provide a surgical pad molded from foam latex.

A molded foam latex pad has considerable advantages over the formerly known sponge rubber or other surgical pads due to the extreme resiliency of the pad, the lightness in weight, the tremendous restorative power after pressure has been removed, and the fact that no portion of the pad became hard after prolonged compression.

A molded foam rubber pad as compared with one of cut or split foam latex presents many advantages, including the following:

1. A molded pad, by virtue of the molding operation, has an integral skin over the outer surface thereof which prevents the pad from absorbing water in the bath or shower.

2. The molded pad will permit the practical use of softer foam latex than will a cut foam pad, because the integral skin formed by the molding operation prevents crumbling and provides sufficient body to hold the pad together, without added material as a strengthening means.

3. The molding of the pad permits the acquisition of shapes and sizes not possible if the pad is made from cut or split foam latex. For example, a bevel edge inside a central aperture of the pad may be acquired by the molding process, but is not obtainable when a cut or split material, or felt, is utilized.

4. Sharp corners may be eliminated, and suitable bevels readily provided on outer edges with a molded pad.

5. A molded pad with beveled edges provides less friction when in contact with shoes, hose, bed clothes, or the like, than a cut or split foam latex pad.

It is also an object of this invention to provide a surgical pad molded in its entirety of foam latex, with an adhesive undersurface applied directly to the foam latex.

Still another object of the invention resides in the provision of a new and novel method of making surgical pads.

It is a further feature of the invention to provide a new and novel method of making surgical pads which includes the steps of molding a sheet of rubber having separated upward projecting portions, each of which define the upper portion of a surgical pad, and applying adhesive either by way of a fabric member or without to the lower face of the molded sheet, and individually severing each pad from the sheet by cutting around the edge of the upwardly projecting portions. In so doing, if so desired, a plastic film may be sprayed over the tops of the pads prior to their severance from the sheet.

While some of the more salient features, characteristics and advantages of the instant invention have been above pointed out, others will become apparent from the following disclosures, taken in conjunction with the accompanying drawing, in which—

Figure 1 is a top plan view, fragmentary in character, illustrating a step in the process of molding surgical pads of foam latex;

Figure 2 is an enlarged fragmentary vertical sectional view taken substantially as indicated by the line II—II of Fig. 1, looking in the direction of the arrows, showing a further stage in the process;

Figure 3 is a pictorial illustration of a foam latex surgical pad embodying improvements of the instant invention and made in accordance with the method embodied in the instant invention.

As shown on the drawings:

In Fig. 3 I have illustrated an exemplary form of surgical pad embodying principles of this invention. The illustrated pad is in the form of a corn pad, shown exaggerated in size. The pad is constructed entirely of foam latex and includes a body portion 1 having a substantially flat top 2, a central aperture or opening 3 for the reception of the particular affliction, and a relatively wide bevel 4 around the upper marginal edge. On the underside thereof the pad carries an adhesive surface 5 by means of which it is attached to the body of a user.

It will be especially noted that there is an inwardly and downwardly sloping bevel 6 inside the top of the opening 3 to eliminate any drag on apparel, bed clothes, etc. at this point. This is an important feature of the instant invention.

As pointed out hereinabove, the pad illustrated in Fig. 3 may be made of softer foam than a cut or slit foam latex pad, it has eliminated sharp corners and the bevels 4 and 6 provide much less friction when in contact with clothing or bed clothes, and being molded the outer surface is provided with an integral skin, so-called, which not only renders the pad substantially waterproof, but also enables the pad to maintain its shape without outside assistance, and further reduces friction.

The pad may be made in several different ways. For example, it may be molded in its entirety from foam latex in which event the skin resulting from the molding operation will be on every exposed surface of the pad.

The adhesive undersurface 5 may be applied directly to the bottom surface of the foam latex body portion.

Another method of producing a pad of this character is illustrated more particularly in Figs. 1 and 2. In this showing, a sheet of latex foam 7 is molded with a plurality of upwardly projecting portions, each said portion comprising the upper part of a surgical pad. Each upward projection includes the flat top surface 2, and the bevel 4 above described. In lieu of the central opening or aperture 3, however, a recess 8 is provided. Depending upon the thickness of the sheet, exclusive of the upper separated pad portions, a lower fabric sheet 9 may or may not be used. In the event the thickness of the sheet intermediate the separated projecting portions is relatively thick, it is preferable to utilize the fabric sheet which may be cemented or doubled to the undersurface of the foam latex sheet 7. However, if the latex sheet in between the pad-like projections is relatively thin, the skin resulting from the mold will cover more of the surface of the pad, and especially the resultant side edge of the pad, and in that event the fabric sheet is not necessary. The aforesaid adhesive undersurface 5 by means of which the pad is attached to the body of a user is applied either to the bottom of the latex sheet 7 or to the fabric sheet 9 if the latter is utilized.

As seen in Fig. 2, if so desired, the entire upper surface of the molded sheet, including the projecting pad portions, may be covered with a thin plastic film 10, such for example as a vinyl plastic film. This may obviously be applied by spraying the atomized material over the upper face of the sheet. The film 10 may be flesh colored or transparent, as desired, and when used renders the upper surface of the pad extremely smooth.

After the molding of the foam latex sheet, the attachment of the fabric layer 9 if the same is utilized, the application of the adhesive undersurface 5, and the application of the film 10, if the same is used, a finished pad may be died out or severed from the sheet by simply cutting through the sheet around the margin of each separated pad portion, and at the same time the central part of the die will provide the aforesaid aperture 3 together with the bevel 6 by cutting through the recesses 8 inside the bounding edge thereof as indicated by the dotted lines of cut 11—11 in Fig. 2.

From the foregoing, it is apparent that I have provided a novel surgical pad made of molded foam latex, whereby the pad retains its shape, does not crumble during use, is substantially waterproof, may be made of softer material than pads heretofore known, sharp corners both at outer and inner edges of the pad are readily eliminated, and less frictional surface is provided for rubbing on articles of apparel or bed clothes. It will also be noted that the pad as well as the practice of the methods included herein are extremely economical.

It will be understood that modifications and variations may be effected without departing from the scope of the novel concepts of the present invention.

I claim as my invention:

1. The method of making surgical pads, including the steps of molding a sheet of foam latex with separated protruding portions on the upper face thereof, each said portion defining the upper part of a surgical pad and each said portion having a central indentation in the upper surface thereof, providing an adhesive surface for the underside of said sheet, and severing pads from said sheet by cutting through the sheet around the outside edges of said protruding portions and along a line spaced inwardly from the outer edges of said indentations to leave an inside bevel at the upper edge of the opening provided by the cut through each indentation.

2. A surgical pad, including a body part of foam latex having an opening therein, the upper portion of said body part comprising a molded surface including a flat top, a bevel therearound, and a bevel around said opening, and the bounding edge of said pad below the first said bevel and the inner edge of the opening below the second said bevel being straight cut.

References Cited in the file of this patent

UNITED STATES PATENTS

| | | |
|---|---|---|
| 607,950 | Pierrepont | July 26, 1898 |
| 876,022 | Schiffhauer | Jan. 7, 1908 |
| 897,920 | McIntyre | Sept. 8, 1908 |
| 1,382,678 | Scholl | June 28, 1921 |
| 1,482,045 | Stearns | Jan. 29, 1924 |
| 1,586,076 | Dickey | May 25, 1926 |
| 1,974,548 | Somogyi | Sept. 25, 1934 |
| 1,979,691 | Jackson | Nov. 6, 1934 |
| 2,063,019 | Bardach | Dec. 8, 1936 |
| 2,125,008 | Scholl | July 26, 1938 |
| 2,148,882 | Scholl | Feb. 28, 1939 |
| 2,534,660 | Collis | Dec. 19, 1950 |
| 2,585,691 | Scholl | Feb. 12, 1952 |
| 2,599,523 | Dorr | June 3, 1952 |
| 2,673,372 | Karniol | Mar. 30, 1954 |

FOREIGN PATENTS

| | | |
|---|---|---|
| 244,322 | Great Britain | Dec. 17, 1925 |
| 397,700 | Great Britain | Aug. 31, 1933 |